United States Patent
Ono et al.

(10) Patent No.: US 7,764,312 B2
(45) Date of Patent: Jul. 27, 2010

(54) FLICKER CORRECTION METHOD AND DEVICE, AND IMAGING DEVICE

(75) Inventors: Noriyuki Ono, Tokyo (JP); Motohiro Nakasuji, Kanagawa (JP); Yoshiaki Nishide, Kanagawa (JP); Hiromasa Ikeyama, Tokyo (JP)

(73) Assignee: Sony Corporation, Tokyo (JP)

(*) Notice: Subject to any disclaimer, the term of this patent is extended or adjusted under 35 U.S.C. 154(b) by 861 days.

(21) Appl. No.: 11/432,078

(22) Filed: May 11, 2006

(65) Prior Publication Data
US 2006/0256208 A1  Nov. 16, 2006

(30) Foreign Application Priority Data
May 13, 2005  (JP) .................. P2005-141614

(51) Int. Cl.
H04N 9/73 (2006.01)
H04N 5/235 (2006.01)
(52) U.S. Cl. ............... 348/226.1; 348/227.1; 348/222.1
(58) Field of Classification Search .............. 348/227.1, 348/226.1
See application file for complete search history.

(56) References Cited

U.S. PATENT DOCUMENTS

| | | | | |
|---|---|---|---|---|
| 6,442,206 | B1 * | 8/2002 | Hrusecky ................ | 375/240.21 |
| 6,807,316 | B2 * | 10/2004 | Enomoto .................... | 382/264 |
| 7,164,439 | B2 * | 1/2007 | Yoshida et al. ........... | 348/226.1 |
| 7,298,401 | B2 * | 11/2007 | Baer ........................ | 348/226.1 |
| 7,471,315 | B2 * | 12/2008 | Silsby et al. ............. | 348/226.1 |
| 2004/0012692 | A1 * | 1/2004 | Arazaki .................... | 348/226.1 |
| 2004/0179114 | A1 * | 9/2004 | Silsby et al. ............. | 348/226.1 |
| 2005/0018920 | A1 * | 1/2005 | Ramamurthy ............... | 382/254 |
| 2005/0231620 | A1 * | 10/2005 | Fraenkel et al. ............ | 348/308 |
| 2006/0055823 | A1 * | 3/2006 | Kinoshita et al. ........... | 348/511 |
| 2006/0158531 | A1 * | 7/2006 | Yanof ...................... | 348/226.1 |
| 2009/0051782 | A1 | 2/2009 | Ono et al. | |

FOREIGN PATENT DOCUMENTS

| | | |
|---|---|---|
| EP | 1 566 962 | 8/2005 |
| EP | 1 679 906 | 7/2006 |
| EP | 1 814 310 | 8/2007 |
| JP | 2001 16508 | 1/2001 |
| JP | 2001016508 A * | 1/2001 |
| JP | 2003 333423 | 11/2003 |
| JP | 2004-222228 | 8/2004 |
| WO | WO 2005 043924 | 5/2005 |
| WO | WO 2006/051914 | 5/2006 |

* cited by examiner

*Primary Examiner*—Lin Ye
*Assistant Examiner*—Amy Hsu
(74) *Attorney, Agent, or Firm*—Frommer Lawrence & Haug LLP; William S. Frommer; Ellen Marcie Emas

(57) ABSTRACT

Even when the light intensity of the light source varies, the flicker correction can thus be made flexibly. The present invention provides a flicker correction method comprising the steps of predicting, from an image of a present flicker-corrected frame, a flicker of an image of a next frame to generate two types of flicker images having flickers different in level from each other added thereto, detecting a flicker component through comparison between the generated two types of flicker images and an image of an input next frame, generating a flicker correction value on the basis of the detected flicker component, and making flicker correction by adding the generated flicker correction value to an input image frame by frame.

8 Claims, 11 Drawing Sheets

Flicker image when image sensor is of global shutter type

Flicker image when image sensor is of rolling shutter type

FLICKER CORRECTION METHOD AND DEVICE, AND IMAGING DEVICE

CROSS REFERENCES TO RELATED APPLICATIONS

The present invention contains subject matter related to Japanese Patent Application JP 2005-141614 filed in the Japanese Patent Office on May 13, 2005, the entire content of which is incorporated herein by reference.

BACKGROUND OF THE INVENTION

1. Field of the Invention

The present invention relates to a flicker correction method and device, and an image pickup device, in which a flicker is corrected by subtracting a flicker correction signal from an image signal.

2. Description of the Related Art

In the conventional image sensor, the timing of charge storage differs depending upon whether the charge storage is made per plane or per line. Generally, timing of the charge storage per plane is called "global shutter system" while timing of the charge storage per line is called "rolling shutter system". Most of the CCDs have adopted an image sensor of the global shutter type in the past. Recently, however, increasingly more attention has been paid to the CMOS image sensors that consume less power than the CCDs and can be produced more inexpensively than the CCDs because of their smaller number of parts. Many of the CMOS image sensors adopt the rolling shutter system for their structural problem. With one of the two shutter systems, when imaging is made under the light of a light source repeating turning on and off, light and dark fringes will appear in an entire image plane (plane flicker), while with the other shutter system, light and dark fringes will appear per line (in-plane flicker).

FIG. 1 shows a difference in amount of charge storage in an image sensor adopting the global shutter system, and FIG. 2 shows an example of image incurring a plane flicker when the image sensor is of the global shutter type. FIG. 3 shows a difference in amount of charge storage in an image sensor adopting the rolling shutter system, and FIG. 4 shows an example of image incurring an in-plane flicker. Also, a flicker component included in an image captured under the light of a light source cyclically turning on and off can be approximated to a sinusoidal wave, and there has been prevalent the method of forming a corrected image by removing the flicker on the basis of the nature of the sinusoidal wave.

For the flicker correction, there was proposed a method of controlling the gain on the basis of a flicker component detected in an input image (as in the Japanese Patent Application Laid Open No. 2004-222228.

SUMMARY OF THE INVENTION

When an object is imaged with a digital camera under the light of a light source that repeats turning on and off cyclically, such as a fluorescent lamp, cyclic light and dark fringes will appear in a captured image of the object, resulting in that they will seemingly run in the image. Otherwise, there will cyclically take place a difference in brightness between frames over an image. This is called "flicker". The flicker is a problem unavoidably taking place when an object is imaged with a digital camera using an image sensor to image the object under the light of a flickering light source with the timing of charge storage being shifted.

For flicker correction, the feature that a flicker can be approximated to a sinusoidal wave is utilized to detect a flicker component in an input signal. Similarly, a correction amount is calculated from the characteristic of the sinusoidal wave and detected flicker component, and the correction amount is added to the input signal or the latter is multiplied by the correction amount. For approximation of the flicker component to the sinusoidal wave, three features "cycle", "phase" and "amplitude" have to be detected.

A cycle can be detected based on a power supply frequency and frame rate.

On this account, the Applicant of the present invention proposed a flicker correction method including the steps of acquiring a flicker correction signal corresponding to a flicker component included in each of specific periods of a video signal formed from a succession of the specific periods and containing the flicker component in response to a correction error signal for each specific period and calculating the flicker correction signal and each specific period to generate a corrected video signal for one specific period, whose flicker component has been corrected, detecting a correction error of the flicker component in the corrected video signal for one specific period before each of the specific periods and each specific period to acquire the correction error signal as one corresponding to the detected correction error, and acquiring the flicker correction signal as one which reduces the correction error correspondingly to the correction error signal (as in the Japanese Patent Application Laid Open No. 2004-330299).

The above flicker correction method is performed with no flicker amplitude being detected but with a fixed value of flicker. In case the light from the light source does not vary, the method can be performed without any problem even with a fixed value of flicker amplitude. However, in case the light from the light source varies, the flicker amplitude has to be changed appropriately. This conventional method is thus not versatile.

It is therefore desirable to overcome the above-mentioned drawbacks of the related art by providing a flicker correction method and apparatus and an image pickup device, in which flicker can flexibly be corrected even when the light intensity of a light source varies.

According to the present invention, flicker correction is made by detecting a flicker component in an input image signal, calculating a correction value based on the detected flicker component and adding the correction value to the input image signal.

According to the present invention, there is provided a flicker correction method including the steps of:

predicting, from an image of a present flicker-corrected frame, a flicker of an image of a next frame to generate two types of flicker images having flickers different in level from each other added thereto;

detecting a flicker component through comparison between the generated two types of flicker images and an image of an input next frame;

generating a flicker correction value on the basis of the detected flicker component; and making flicker correction by adding the generated flicker correction value to an input image frame by frame.

According to the present invention, there is also provided a flicker correction device including:

a flicker correcting means for making flicker correction by adding a flicker correction signal to an input image signal; and a flicker correction signal generating means for predicting a flicker of an image of a next frame from the image signal having been flicker-corrected by the flicker correcting means and an image signal not yet flicker-corrected to generate two types of flicker images to which flickers different in level from each other, detecting a flicker component through comparison between the generated two types of flicker images and an image of an input next frame and generating a flicker correction value on the basis of the detected flicker component, the flicker correcting means adding, to the input image signal, the flicker correction signal generated frame by frame by the flicker correction signal generating means to make flicker correction.

According to the present invention, there is also provided an image pickup device including a flicker correction device to make flicker correction by adding a flicker correction signal to an image signal captured by the image pickup device, the flicker correction device including:

a flicker correcting means for making flicker correction by adding a flicker correction signal to an input image signal; and a flicker correction signal generating means for predicting a flicker of an image of a next frame from the image signal having been flicker-corrected by the flicker correcting means and an image signal not yet flicker-corrected to generate two types of flicker images to which flickers different in level from each other, detecting a flicker component through comparison between the generated two types of flicker images and an image of an input next frame and generating a flicker correction value on the basis of the detected flicker component, the flicker correcting means adding, to the input image signal, the flicker correction signal generated frame by frame by the flicker correction signal generating means to make flicker correction.

According to the present invention, the amplitude of flickers can sequentially be predicted through comparison between an amplitude-predicted flicker image and an image captured by an image sensing device (will also be referred to as "imaging element" herein). Even when the light intensity of the light source varies, the flicker amplitude can flexibly be adjusted in an automatic manner to correct a flicker at any time. Also, even when imaging is made while relocating from a place with a flicker source to a flicker-free place, the flicker amplitude can automatically be varied and the flicker correction be ceased. Further, even when imaging is made while relocating a flicker-free place to a place with a flicker source, the flicker amplitude can automatically be varied and the flicker correction be made.

Therefore, according to the present invention, even when the light intensity of the light source varies, the flicker correction can thus be made flexibly.

DETAILED DESCRIPTION OF THE PREFERRED EMBODIMENTS

The present invention will be described in detail below concerning the embodiments thereon with reference to the accompanying drawings. It should be noted that the present invention is not limited to the embodiments which will be described herebelow but it may be can be modified in various manners, constructed alternatively or embodied in various other forms without departing from the scope and spirit thereof.

Figure 1:
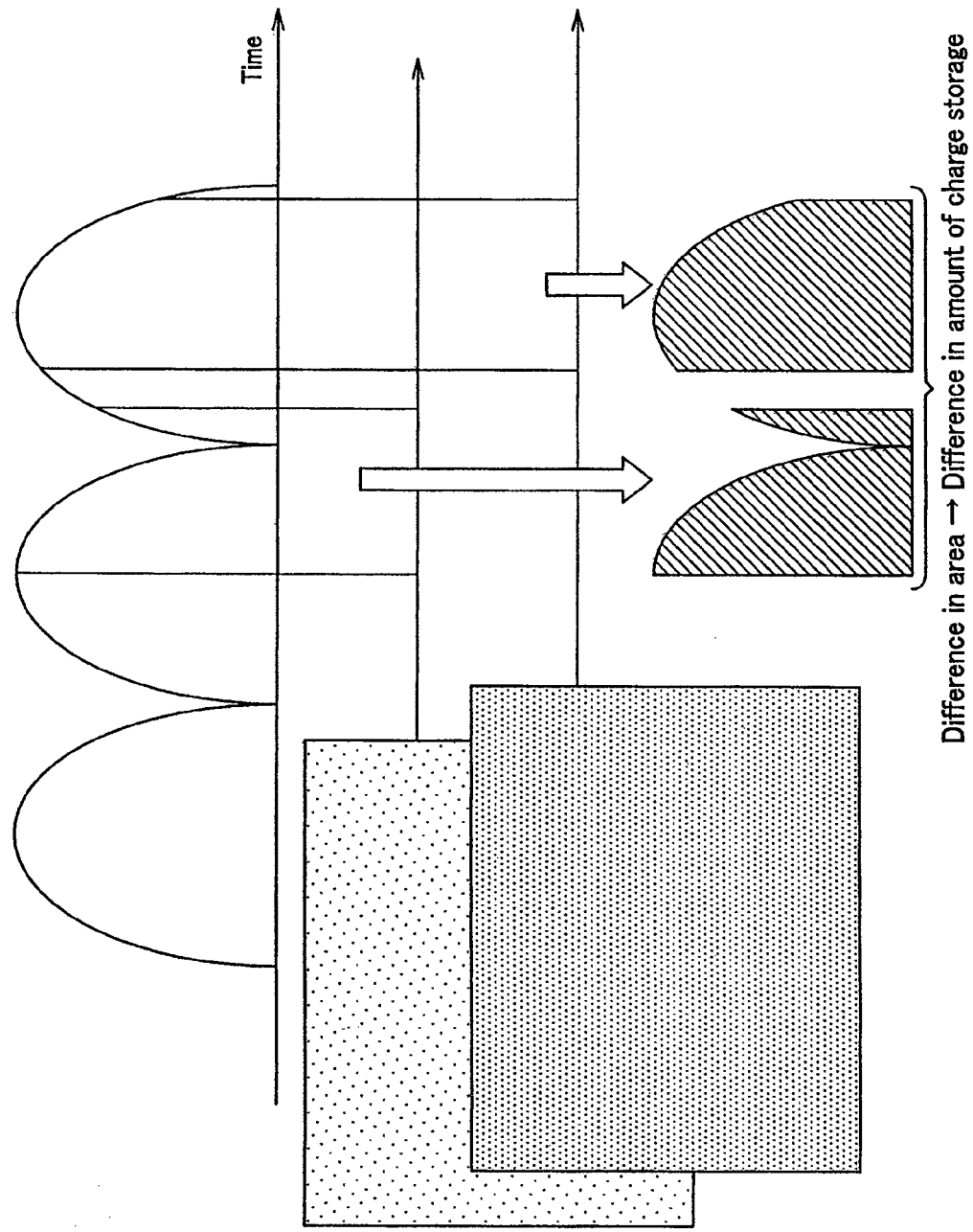
FIG. 1 schematically illustrates a difference in amount of charge storage in an image sensor of the global shutter type.
Figure 2:
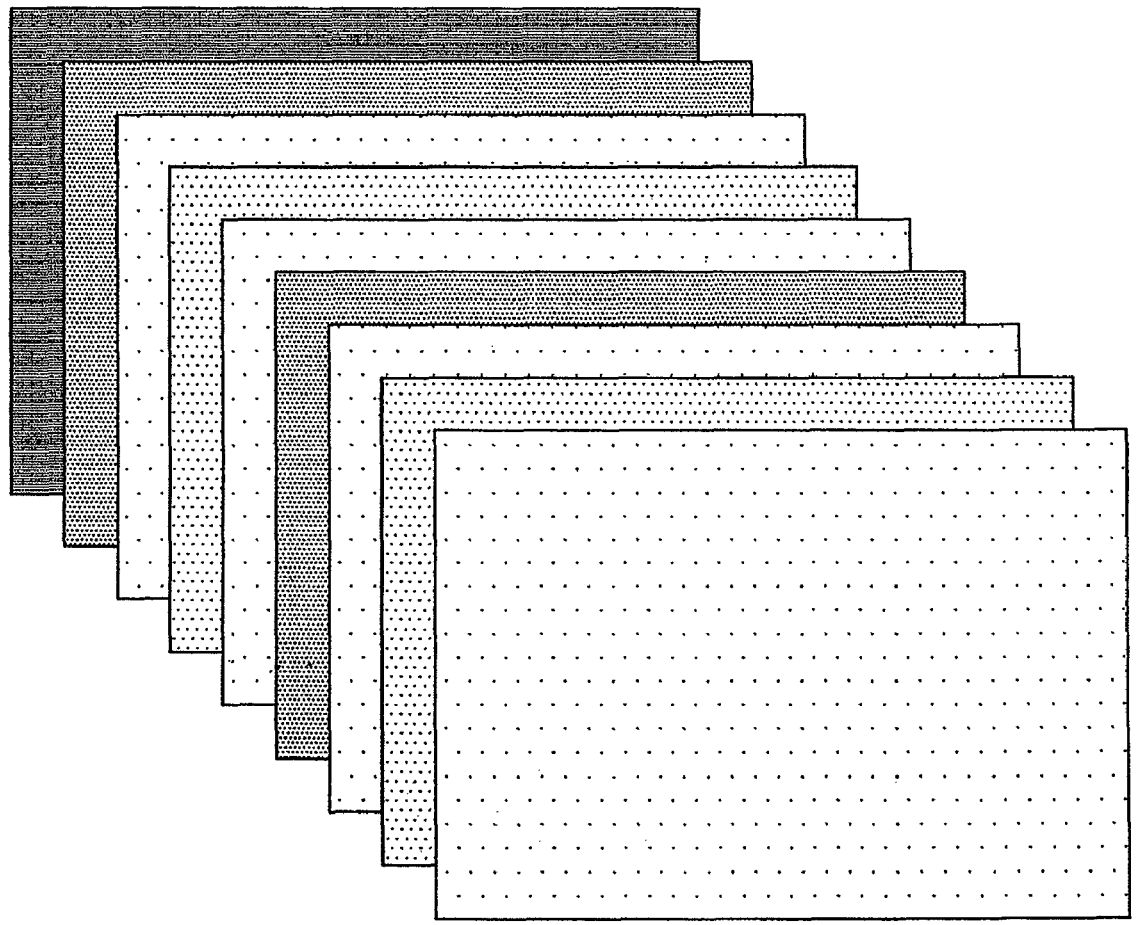
FIG. 2 schematically illustrates an example of plane flicker image appearing when the global shutter system is adopted.
Figure 3:
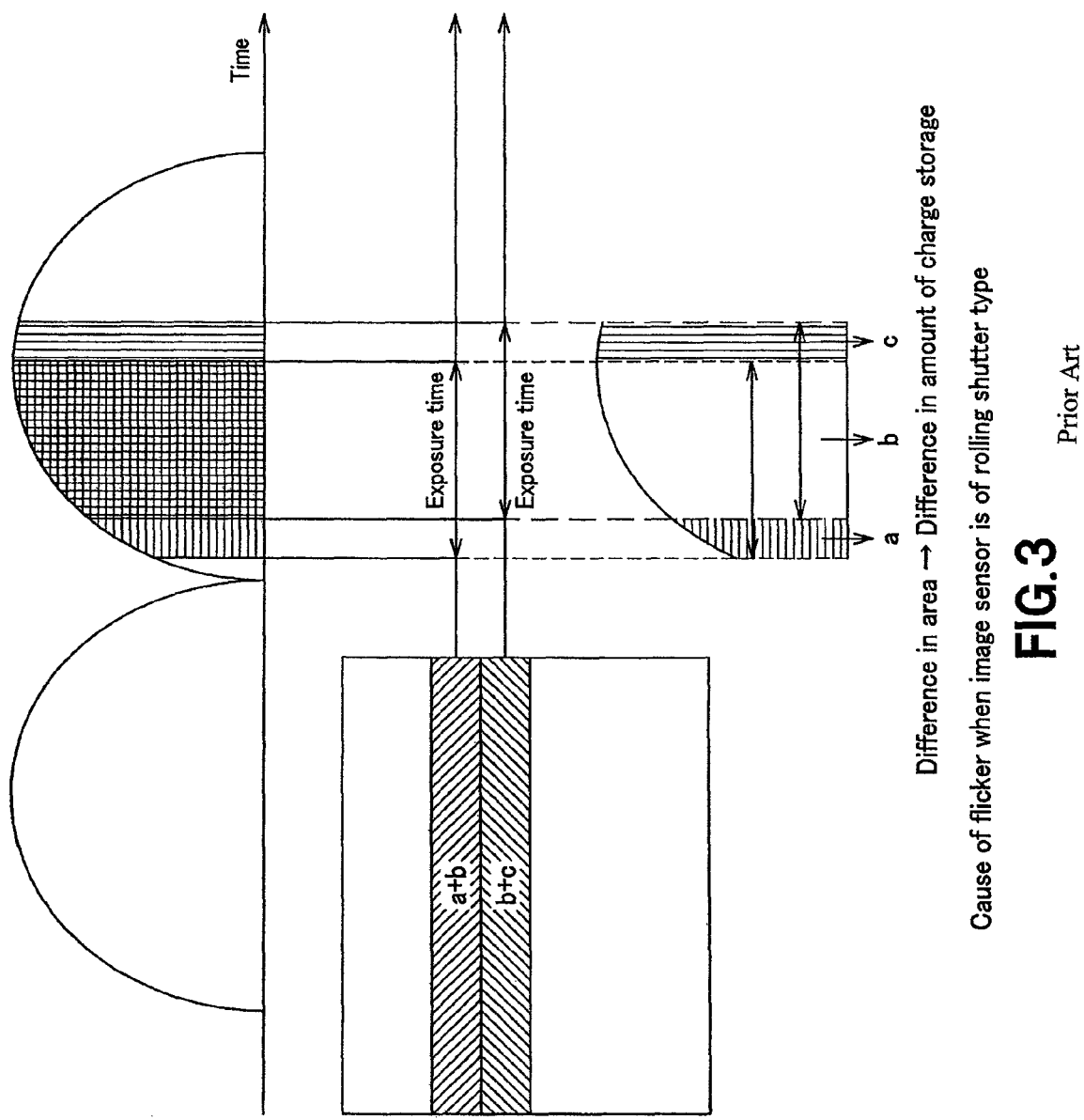
FIG. 3 schematically illustrates a difference in amount of charge storage in an image sensor of the rolling shutter type.
Figure 4:
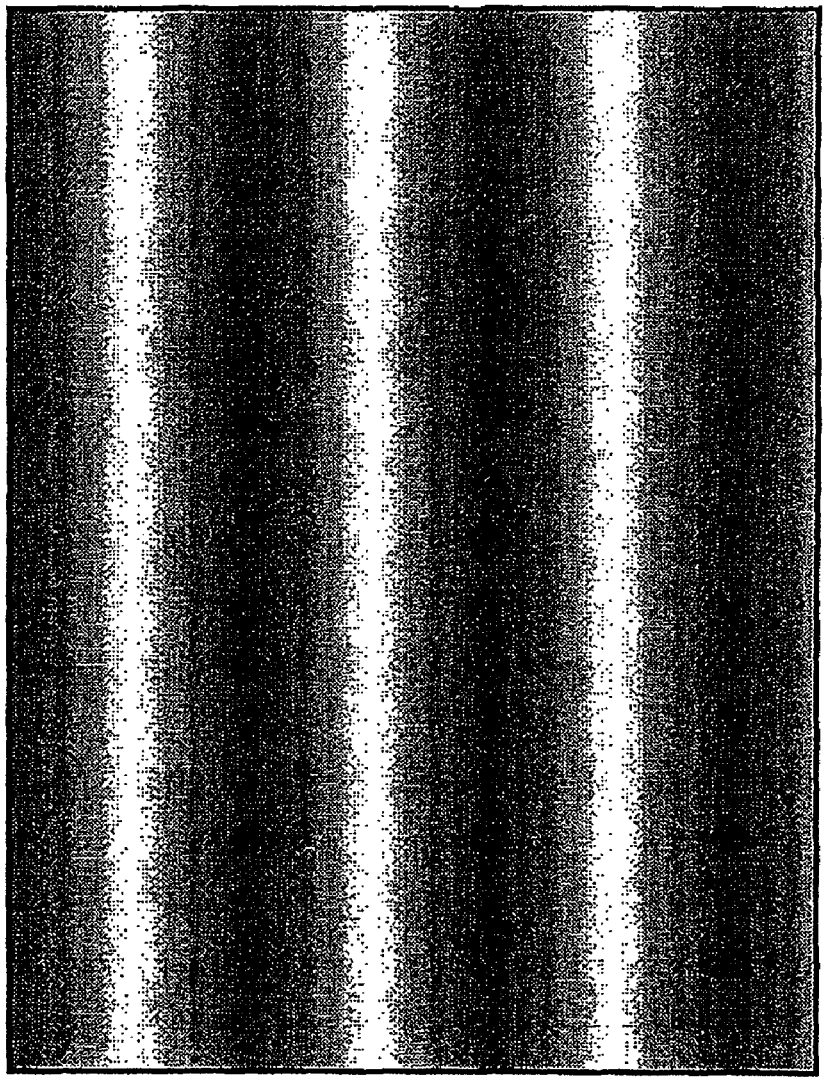
FIG. 4 schematically illustrates an example of in-plane flicker image.
Figure 5:
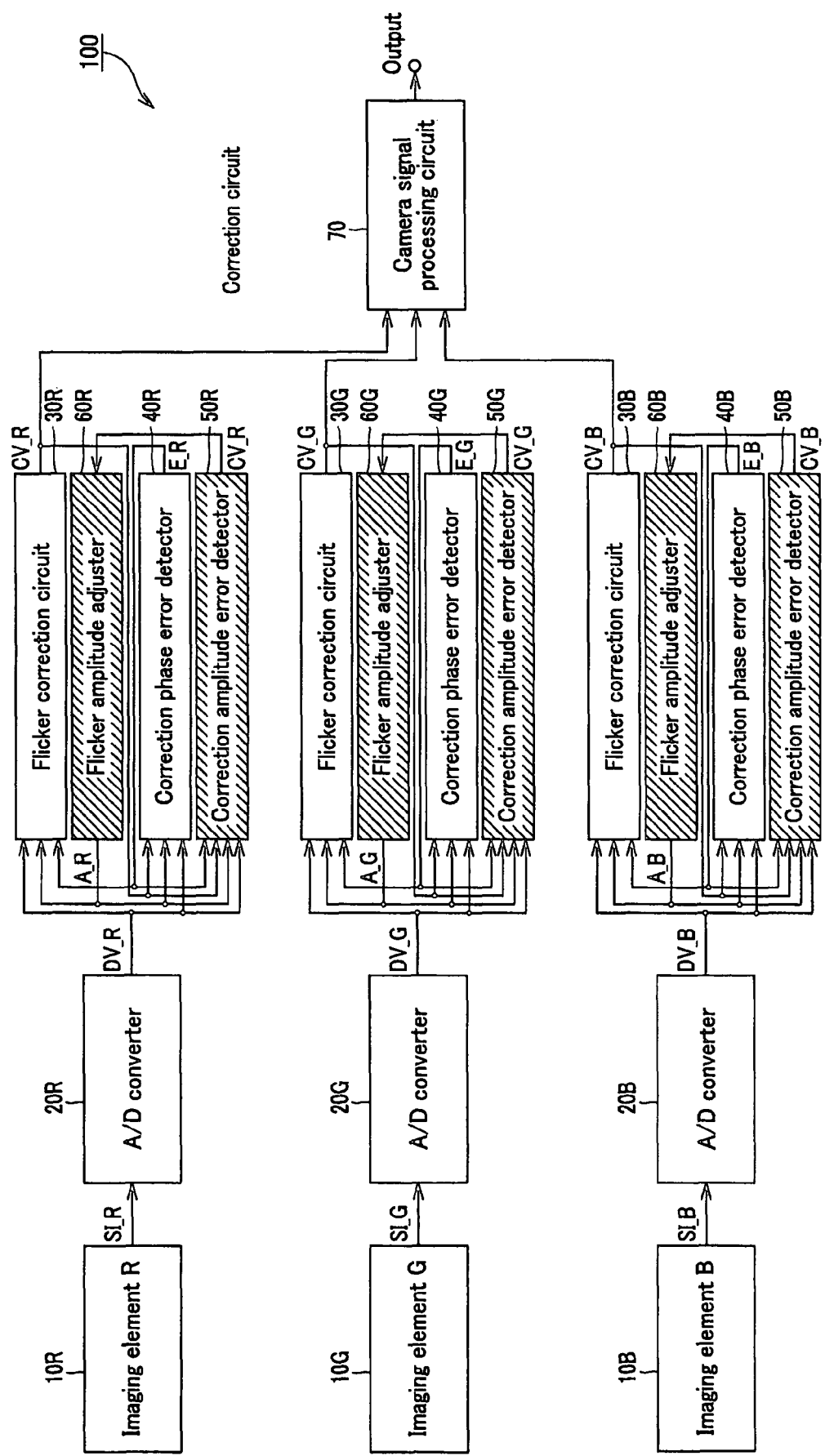
FIG. 5 is a schematic block diagram of an image pickup device as one embodiment of the present invention.

The present invention is applicable to an image pickup device constructed as shown in FIG. 5. The image pickup device is generally indicated with a reference numeral 100.

The image pickup device 100 includes a red color image sensing device (image element) 10R, green color image sensing device (imaging element) 10G, blue color image sensing device (imaging element) 10B, A-D converters 20R, 20G and 20B to digitize image signals SI_R, SI_G and SI_B of color images captured by the image sensing devices 10R, 10G and 10B, respectively, flicker correction circuits 30R, 30G and 30B, correction phase error detectors 40R, 40G and 40B and correction amplitude error detectors 50R, 50G and 50B, supplied with the image signals DV_R, DV-G and DV_B digitized by the A-D converters 20R, 20G and 20B, respectively, flicker amplitude adjusters 60R, 60G and 60B supplied with correction amplitude error signals C_R, C_G and C_B detected by the correction amplitude error detectors 50R, 50G and 50B, respectively, camera signal processing circuit 70 supplied with image signals CV_R, CV_G and CV_B flicker-corrected by the flicker correction circuits 30R, 30G and 30B, respectively, etc.

Supplied with the image signals CV_R, CV_G and CV_B flicker-corrected by the flicker correction circuits 30R, 30G and 30B, respectively, and with the flicker amplitude signals A_R, A_G and A_B adjusted by the flicker amplitude adjusters 60R, 60G and 60B, respectively, the correction phase error detectors 40R, 40G and 40B detect correction phase errors of the image signals CV_R, CV_G and CV_B in the digitized image signals DV_R, DV_G and DV_, flicker-corrected image signals CV_R, CV_G and CV-B and flicker amplitude signals A_R, A_G and A_B to generate correction phase error signals E_R, E_G and E_B, and supply the generated correction amplitude error signals E_R, E_G and E_B to the flicker correction circuits 30R, 30G and 30B, and correction amplitude error detectors 50R, 50G and 50B, respectively.

Supplied with the image signals CV_R, CV_G and CV_B flicker-corrected by the flicker correction circuits 30R, 30G and 30B, respectively, and with the flicker amplitude signals A_R, A_G and A_B adjusted by the flicker amplitude adjusters 60R, 60G and 60B, respectively, the correction amplitude error detectors 50R, 50G and 50B detect correction phase errors of the image signals CV_R, CV_G and CV_B in the digitized image signals DV_R, DV_G and DV_B, flicker-corrected image signals CV_R, CV_G and CV_B and flicker amplitude signals A_R, A_G and A_B and correction phase error signals E_R, E_G and E_B to generate correction amplitude error signals C_R, C_G and C_B, and supply the generated correction amplitude error signals E_R, E_G and E_B to the flicker amplitude adjusters 60R, 60G and 60B, respectively.

The flicker amplitude adjusters 60R, 60G and 60B generate flicker amplitude signals A_R, A_G and A_B from the correction amplitude error signals E_R, E_G and E_B, respectively, and supplies the generated flicker amplitude signals A_R, A_G and A_B to the flicker correction circuits 30R, 30G and 30B, correction phase error detectors 40R, 40G and 40B and correction amplitude error detectors 50R, 50G and 50B, respectively.

Figure 6:
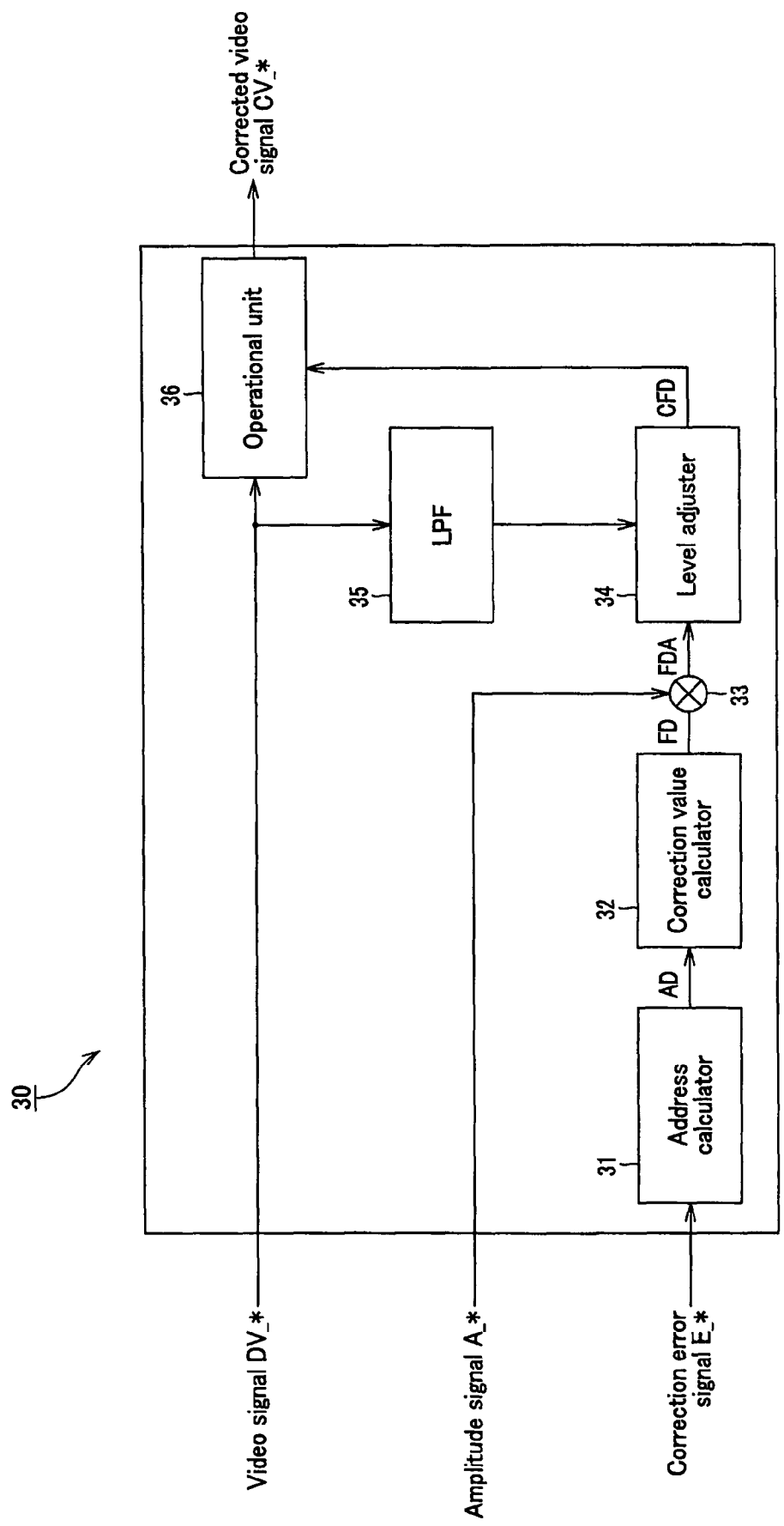
FIG. 6 is also a schematic block diagram of a flicker correction circuit included in the image pickup device shown in FIG. 5.

In the image pickup device 100, each of the flicker correction circuits 30R, 30G and 30B uses a flicker correction circuit 30* constructed as shown in FIG. 6. It should be noted here that the asterisk (*) stands for "R (red)", "G (green)" and "B (blue)".

The flicker correction circuit 30* includes an address calculator 31* supplied with a correction error signal E_* from the correction error detector 40*, correction value calculator 32* supplied with an address AD calculated by the address calculator 31*, multiplier 33* supplied with flicker correction data FD calculated by the correction value calculator 32* and flicker amplitude signal A_* generated by the flicker amplitude adjuster 60*, level adjuster 34* supplied with flicker correction data FDA resulted from multiplication of the flicker correction data FD by the flicker amplitude signal A_* in the multiplier 33, and a low-pass filter (LPF) 35* and operational circuit 36*, supplied with an image signal DV_* digitized by the A-D converter 20*. The image signal DV_* digitized by the A-D converter 20* is supplied, via the low-pass filter (LPF) 35*, to the level adjuster 34* that will then generate a flicker correction value CFD which is to be supplied to the operational circuit 36*.

In the flicker correction circuit 30* constructed as above, the address calculator 31* calculates an address AD in ROMs (flicker memories 321 and 322 which will further be described in detail later) included in the correction value calculator 32* on the basis of the correction error signal E_* supplied from the correction error detector 40*.

The address calculator 31* calculates the address of a present line by calculating the address of a first line in a frame of interest from a power supply frequency and frame rate, and calculating an address increment at each advance by one line toward the address. More specifically, in case the power supply frequency is 50 Hz, frame rate is 30 Hz and the number of vertical clocks of the image sensing device 10* is 1125 clk (these power supply frequency, frame rate and number of clocks of the image sensing device 10* remain unchanged through the following description), the period T between light and dark fringes of a flicker will contain 337.5 lines as given below by an equation 1:

$$T = 30 \text{ Hz} \times 1125 \text{ clk}/(50 \text{ Hz} \times 2) = 37.5 \text{ (clk)} \quad (1)$$

Also, the ROM in the system holds flicker data resulted from division of one period by 512. At each advance by one line, the address in the ROM will be incremented by about 1.51703 as given below by an equation 2:

$$512/337.5 = 1.51703 \quad (2)$$

That is, on the assumption that the correction wave address on the first line is zero (0), the address on the 100th line counted from the first line will be 152 as given below by an equation 3:

$$0 + 1.51703 \times 100 \approx 152 \quad (3)$$

Figure 7:
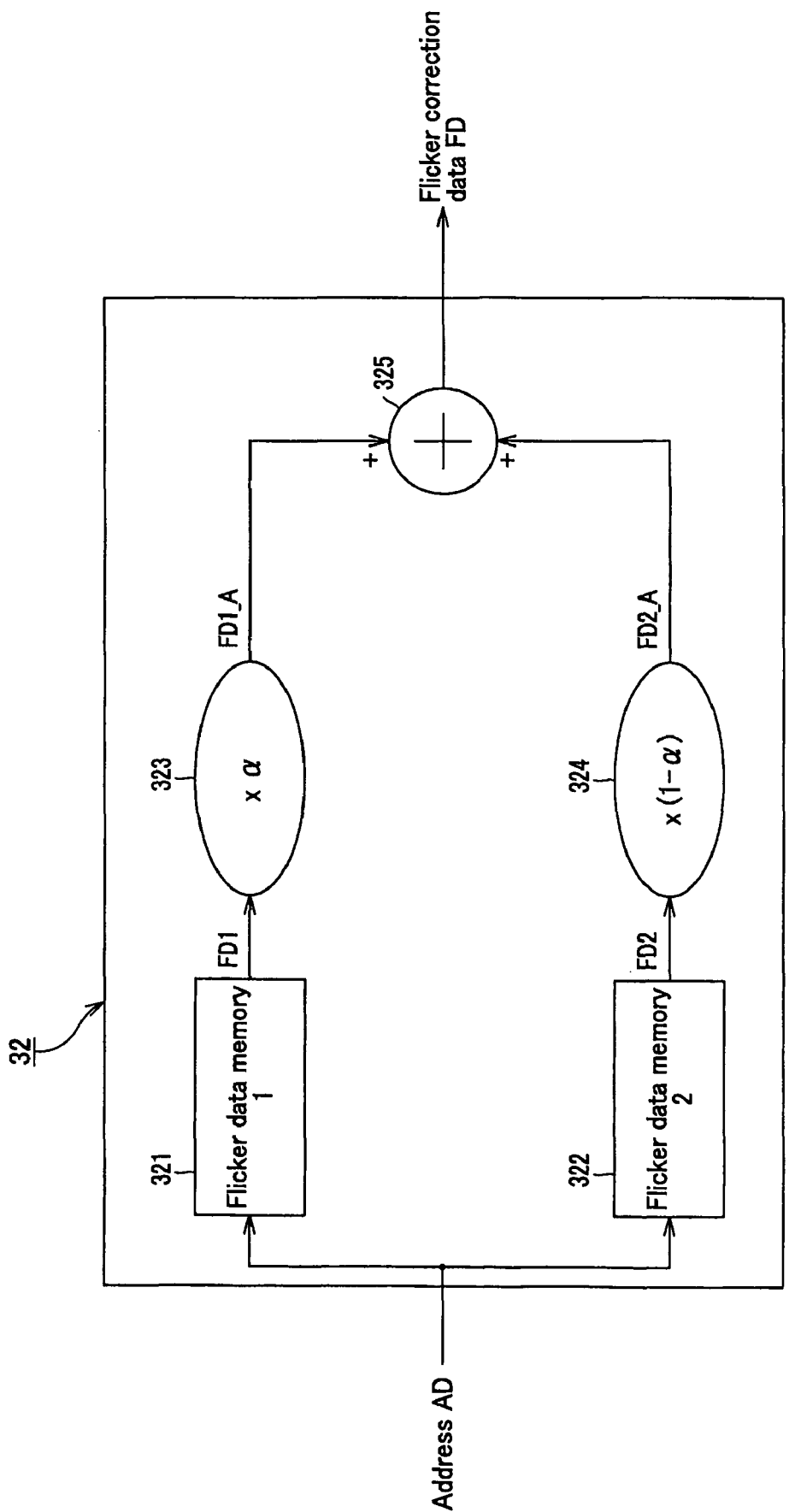
FIG. 7 is a schematic block diagram of a correction value calculator in the flicker correction circuit.

As shown in FIG. 7, the correction value calculator 32* includes flicker memories 321 and 322, multipliers 323 and 324 to multiply two types of flicker data FD1 and FD2 read from the flicker memories 321 and 322 by coefficients α and α−1, respectively, and an adder 325 supplied with flicker data FD1_A and FD2_A multiplied by the coefficients α and α−1, respectively, by the multipliers 323 and 324, respectively. The two types of flicker data FD1 and FD2 will be read from the flicker memories 321 and 322, respectively, according to the address AD calculated by the address calculator 31*.

The correction value calculator 32* calculates one flicker correction data FD by reading the two types of flicker data FD1 and FD2 from the flicker memories 321 and 322, respectively, on the basis of the address AD calculated by the address calculator 31*, multiplying the flicker data FD1 and FD2 by the coefficients α and α−1, respectively, by the multipliers 323 and 324, respectively, correspondingly to a frame rate and shutter speed, and adding the results together by the adder 325.

Note that the periodicity of the flicker data is utilized, the correction value calculator 32* is to hold a part of waveforms of the flicker data FD1 and FD2. Also, flicker data can appropriately be calculated even with any other memory than the ROM. In this embodiment, one flicker correction data FD corresponding to a waveform is synthesized by combining the two flicker data FD1 and FD2 together. However, three or more flicker data can be combined together to synthesize various flicker correction data FD. The flicker correction data FD is updated once by a value depending upon each line per line.

Since the flicker varies in level correspondingly to the value of each pixel, the level is adjusted for each by the use of the input image signal DV_*. However, a noise component in the image signal DV_* will influence the level adjustment.

On this account, in the flicker correction circuit 30* of the image pickup device 100, the input image signal DV_* is passed through the low-pass filter (LPF) 35* to remove the noise component from the image signal DV_* and the noise-free image signal DV_*' is supplied to the level adjuster 34*. The level adjuster 34* can calculate a correction value CFD for each pixel not influenced by the noise from the noise-free image data DV_*' and flicker correction data FD calculated by the correction value calculator 32*.

Note that this embodiment is adapted so that the correction value monotonously increases correspondingly to a pixel value for there has been observed a tendency that the flicker level also increases linearly correspondingly to a pixel value. Also, since no flicker is observed when the pixel value is extremely small or large, the embodiment is adapted to make a calculation taking this feature in account. However, the present invention is not limited to this embodiment.

In the flicker correction circuit 30*, the operational unit 35* adds the correction value CFD for each pixel to the image signal DV_* to provide a corrected image signal CV_*.

Figure 8:
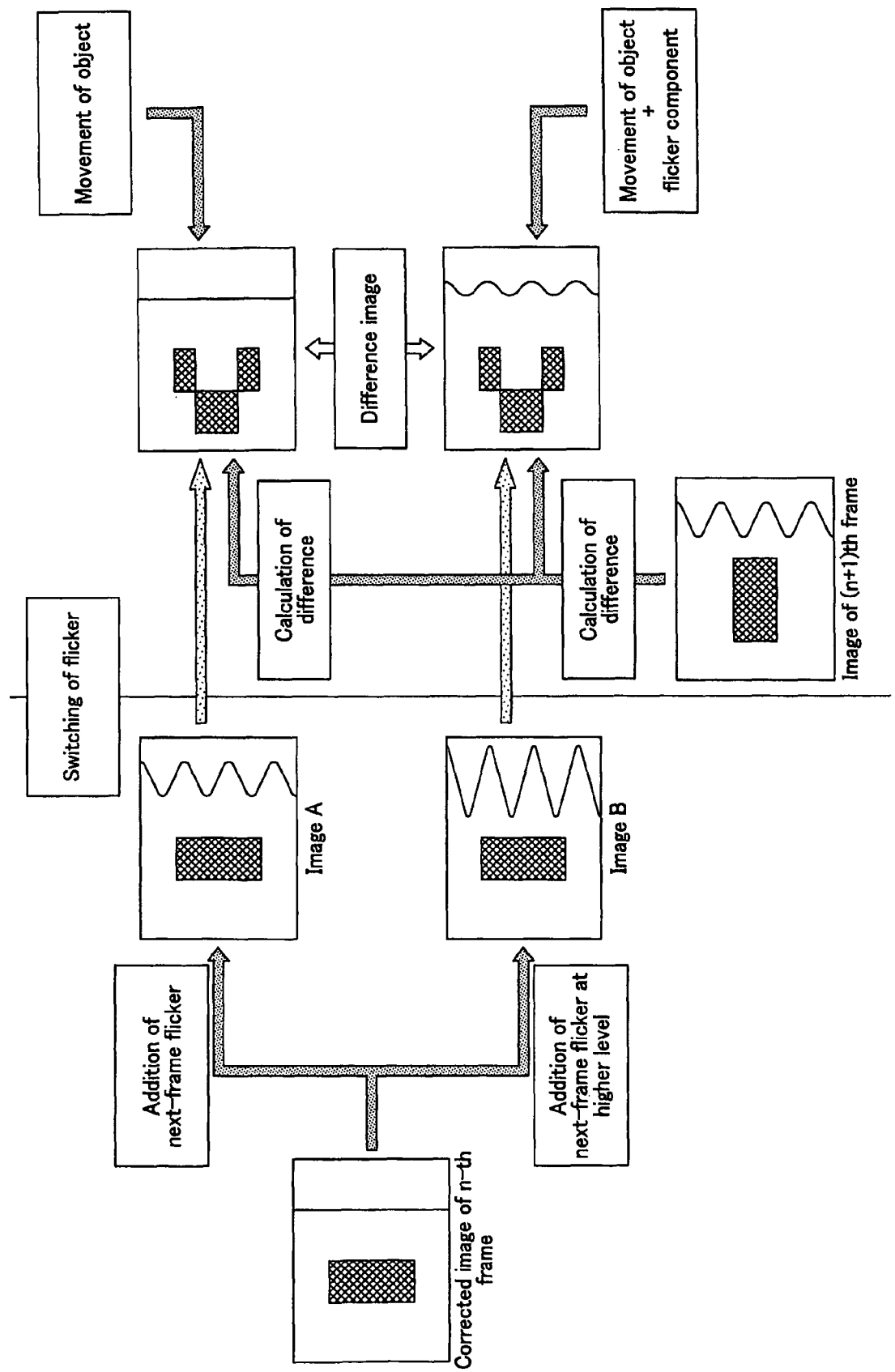
FIG. 8 schematically illustrates an algorithm for correction error detection in the image pickup device.

The algorithm for detection of a correction error in the image pickup device 100 will be described below with reference to FIG. 8.

It is assumed here that a flicker of a certain frame image (image of the n-th frame) could have been corrected to a correct level. Since the flicker is continuous from one frame to another, a flicker of a next frame can be predicted. With the predicted next-frame flicker being kept at the same level as the flicker of an n-th frame, the flicker of a (n+1)th frame is added to the corrected image. A flicker image thus produced is taken as "image A". At the same time, with the level being made higher than that of the n-th frame, the flicker of the (n+1)th frame is added to the flicker-corrected image. A flicker image thus produced is taken as "image B". The image A is an image resulted from addition of the flicker component of the (n+1)th frame to an object image of the n-th frame, while the image B is resulted from addition of the flicker component of the (n+1)th frame whose flicker level has been made higher than that of the image A to the object image of the frame n-th frame. When differences are calculated between the image of the (n+1)th frame actually supplied and images A and B, respectively, only a movement component of the object will appear as the differences because the next-frame flicker is faithfully reproduced in the image A. However, since the image B is made higher in level than the next-frame flicker, it contains two components, namely, the object movement and flicker component as the differences, that is, the predicted flicker component more approximate to the next-frame flicker will take a small value as the difference. Further, there are generated two images, namely, an image having added thereto a flicker component of the (n+1)th frame, higher in level than the flicker of the n-th frame and an image having added thereto a flicker component of the (n+1)th frame, lower in level than the flicker of the n-th frame. When differences are calculated between the two images and image of the (n+1)th frame, respectively, the difference more approximate to the flicker level of the (n+1)th frame will take a small value. Therefore, it is possible to adjust the initial level of an arbitrary flicker to an appropriate flicker level automatically as the time elapses by making a comparison between the differences for each frame.

Each of the correction phase error detectors 40R, 40G and 40B and correction amplitude error detectors 50R, 50G and 50B is designed according to the above-mentioned algorithm.

Figure 9:
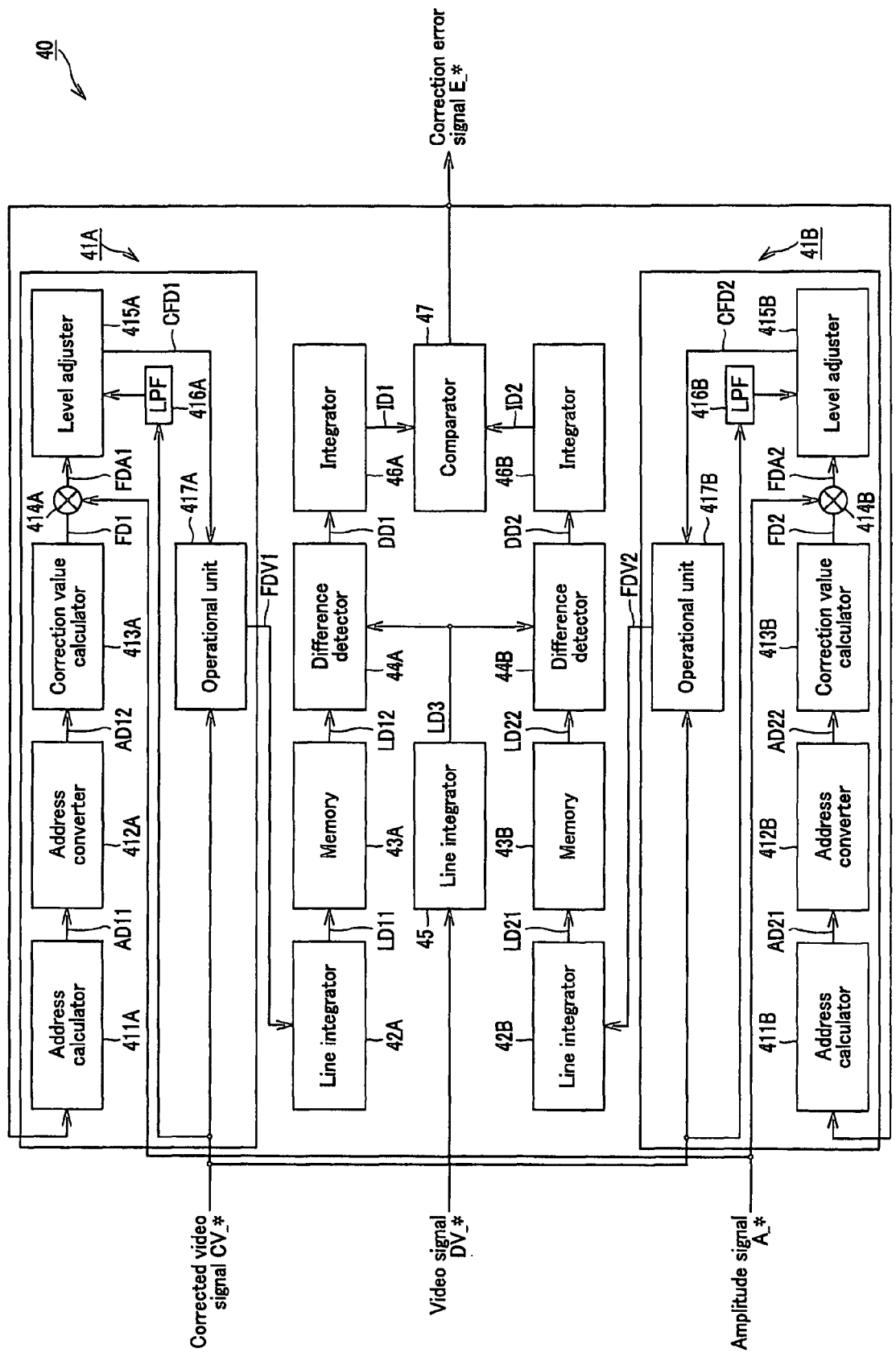
FIG. 9 is a schematic block diagram of a correction phase error detector included in the image pickup device.

In this image pickup device 100, each of the correction phase error detectors 40R, 40G and 40B uses a correction phase error detector 40* constructed as shown in FIG. 9 according to the aforementioned algorithm. It should be noted here that the asterisk (*) stands for "R (red)", "G (green)" and "B (blue)".

The correction phase error detector 40* includes flicker-added signal generators 41A and 41B supplied with an image signal CV_* flicker-corrected by the flicker correction circuit 30* and flicker amplitude signal A_* generated by the flicker amplitude adjuster 60*, line integrators 42A and 42B supplied with flicker-added signals FDV1 and FDV2 generated by the flicker-added signal generators 41A and 41B, respectively, memories 43A and 43B supplied with line data LD11 and LD21 integrated by the line integrators 42A and 42B, respectively, difference detectors 44A and 44B supplied with line data LD12 and LD22 read from the memories 43A and 43B, respectively, line integrator 45 supplied with an image signal DV_* digitized by the A-D converter 20*, integrators 46A and 46B supplied with difference data DD1 and DD2 detected by the difference detectors 44A and 44B, respectively, comparator 47 supplied with integrated data ID1 and ID2 provided by the integrators 46A and 46B, respectively, etc. Line data LD3 provided by the line integrator 45 will be supplied to each of the difference detectors 44A and 44B, and a correction error signal E_* provided as a comparison output from the comparator 47 be supplied to each of the flicker-added signal generators 41A and 41B.

Each of the flicker-added signal generators 41A and 41B includes address calculators 411A and 411B supplied with the correction error signal E_* supplied as a comparison output from the comparator 47, address converters 412A and 412B supplied with addresses AD11 and AD21 calculated by the address calculators 411A and 411B, respectively, correction value calculators 413A and 413B supplied with addresses AD12 and AD22 calculated by the address converters 412A and 412B, respectively, multipliers 414A and 414B supplied with a flicker amplitude signal A_* generated by the flicker amplitude adjuster 60*, level adjusters 415A and 415B supplied with flicker data FD1 and FD2 multiplied by the flicker amplitude signal A_* in the multipliers 414A and 414B, and low-pass filters (LPF) 416A and 416B and operational units 417A and 417B, supplied with an image signal DV_* digitized by the A-D converter 20*. The image signal DV_* digitized by the A-D converter 20* will be supplied, via the low-pass filters (LPF) 416A and 416B, respectively, to the level adjusters 415A and 415B, and correction values CFD1 and CFD2 generated by the level adjusters 415A and 415B, respectively, are supplied to the operational units 417A and 417B, respectively.

In the correction error detector 40* constructed as above, the address calculators 411A and 411B calculate addresses AD11 and AD21 in the ROM on the basis of the correction error signal E_*. The addresses to be thus calculated are resulted from shifting the top address of a flicker of a next frame in the positive- or negative-going direction. These addresses are calculated as in the address calculator 31* in the flicker correction circuit 30*. Also, the ROM included in the correction error detector 40* is identical to that included in the flicker correction circuit 30*.

The address converters 412A and 412B convert the addresses AD11 and AD21 calculated by the address calculators 411A and 411B, respectively, into addresses AD12 and AD22, respectively, from which flickers of a next frame can be reproduced. That is, they convert the addresses AD1 and AD2 into addresses having opposite phases. The addresses AD12 and AD22 converted by the address converters 412A and 412B, respectively, are resulted from prediction of flickers of the next frame, but not intended for correction of the flickers.

The correction value calculators 413A and 413B calculate flicker data FD1 and FD2 on the basis of the addresses AD12 and AD22, respectively, converted by the address converters 412A and 412B, respectively. The flicker data FD1 and FD2 are also determined per line as in the flicker correction circuit 30*. The correction value calculators 413A and 413B are similarly constructed to the correction value calculator 32* included in the flicker correction circuit 30*.

As in the flicker correction circuit 30*, in the flicker-added signal generators 41A and 41B of the correction phase error detector 40*, the image signal DV_* is passed through the low-pass filters (LPF) 416A and 416B to remove noises from the image signal DV_*, the noise-free image signal DV_*' is supplied to the level adjusters 415A and 415B. The level adjusters 415A and 415B calculate correction values CFD1 and CFD2 for each pixel not influenced by the noises on the basis of the noise-free image signal DV_*' and flicker data FD1 and FD2 calculated by the multipliers 414A and 414B, respectively.

The level adjusters 415A and 415B are constructed like the level adjuster 34* included in the flicker correction circuit 30*.

The operational units 417A and 417B add the correction values CFD1 and CFD2 for each pixel to the flicker-corrected image signal CV_* to generate flicker-added signals FDV1 and FDV2 for a next frame. The operational units 417A and 417B are also constructed like the operational unit 36 included in the flicker correction circuit 30*.

The line integrators 42A and 42B calculate line data LD1 and LD21 by integrating certain segments of the flicker-added signals FDV1 and FDV2 of the next frame, respectively. The "segment" may be of an arbitrary value as a horizontal size so far as it is within an image acquired horizontally. With a larger segment, a correction error can be detected with a higher accuracy. The vertical size of the segment may be an integral multiple of the cycle of the light and dark fringes of a flicker within one screen. More specifically, the segment may be given a size of 1000 horizontal pixels by 675 vertical pixels (=337.5×2), namely, of 1000× 675 pixels.

The line data LD11 and LD21 calculated by the line integrators 42A and 42B are stored in the memories 43A and 43B, respectively, until the image signal DV_* of a next frame is supplied. When the image signal DV_* of the next frame is supplied, the line integrator 45 makes line integration of the same segments as those of the flicker-added signals FDV1 and FDV2 which have been integrated to calculate the line data LD3.

The line data LD12 and LD22 stored in the memories 43A and 43B, respectively, and line data LD3 of the next-frame image signal DV_* corresponding to the lines of the line data LD12 and LD22 are supplied to the difference detectors 44A and 44B to provide difference data DD1 and DD2.

The integrators 46A and 46B provide integrated data ID1 and ID2, respectively, by integrating the two difference data DD1 and DD2, respectively.

Then, the comparator 47 judges, by making a comparison in size between these integrated data ID1 and ID2, in which direction an address is shifted for prediction of a correct flicker, positive- or negative-going. For example, in case the integrated data ID* obtained with the address shifted in the positive-going direction is smaller than the integrated data ID* obtained with the address shifted in the negative-going direction, a correction phase error signal E_* is outputted to shift the address in the positive-going direction.

The correction error is minimized by supplying the correction phase error signal E_* to the address calculator 31 of the flicker correction circuit 30* and address calculators 511A and 511B of the correction amplitude error detector 50* to shift the address in a correct direction toward a flicker.

Figure 10:
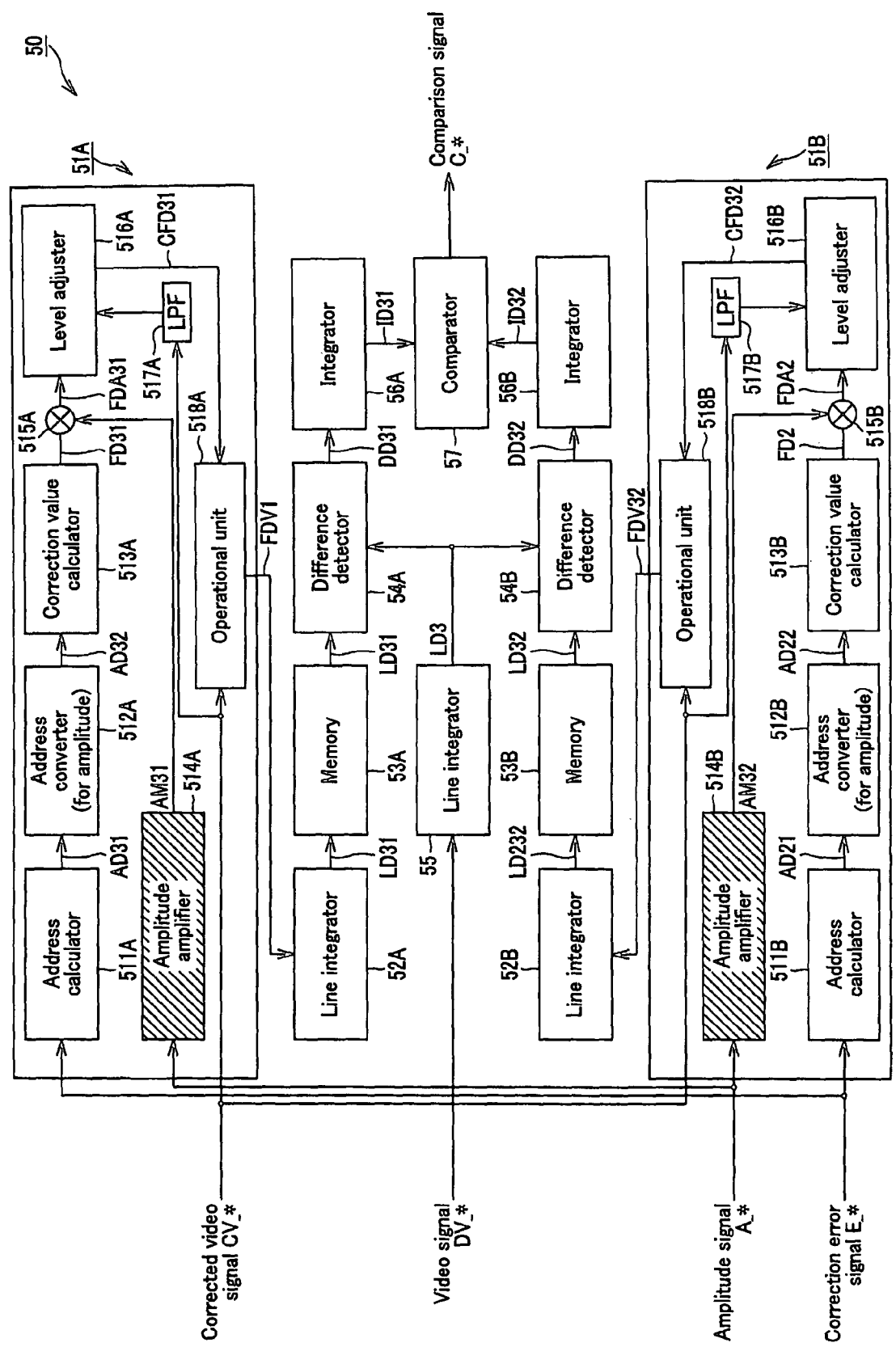
FIG. 10 is a schematic block diagram of a correction amplitude error detector included in the image pickup device.

Also in this image pickup device 100, each of the correction amplitude error detectors 50R, 50G and 50B uses the correction amplitude error detector 60* constructed as shown in FIG. 10 according to the aforementioned algorithm. It should be noted here that the asterisk (*) stands for "R (red)", "G (green)" and "B (blue)".

The correction amplitude error detector 50* includes flicker-added signal generators 51A and 51B supplied with an image signal CV_* flicker-corrected by the flicker correction circuit 30* and flicker amplitude signal A_* generated by the flicker amplitude adjuster 60*, line integrators 52A and 52B supplied with flicker-added signals FDV13 and FDV32 generated by the flicker-added signal generators 51A and 51B, respectively, memories 53A and 53B supplied with line data LD31 and LD32 integrated by the line integrators 52A and 52B, respectively, difference detectors 54A and 54B supplied with line data LD31 and LD32 read from the memories 53A and 53B, respectively, line integrator 55 supplied with an image signal DV_* digitized by the A-D converter 20*, integrators 56A and 56B supplied with difference data DD31 and DD32 detected by the difference detectors 54A and 54B, respectively, comparator 57 supplied with integrated data ID31 and ID32 provided by the integrators 56A and 56B, respectively, etc. Line data LD3 provided by the line integrator 55 will be supplied to each of the difference detectors 54A and 54B.

The flicker-added signal generators 51A and 51B includes address calculators 511A and 511B, respectively, supplied with the correction phase error signal E_* provided as a comparison output from the comparator 47 in the correction phase error detector 40*, address converters 512A and 512B supplied with an address AD31 calculated by the address calculators 511A and 511B, respectively, correction value calculators 513A and 513B supplied with an address AD32 calculated by the address converters 512A and 512B, respectively, amplitude amplifier 514A and amplitude attenuator 514B, supplied with the flicker amplitude signal A_* generated by the flicker amplitude adjuster 60*, multipliers 515A and 515B supplied with flicker data FD31 and CFD31 calculated by the correction value calculators 513A and 513B, respectively, level adjusters 516A and 516B supplied with flicker data CFD1 and CFD2 multiplied by the flicker amplitude signal A_* in the multipliers 515A and 515B, and low-pass filters (LPF) 517A and 517B and operational units 518A and 518B, supplied with an image signal DV_* digitized by the A-D converter 20*. Amplitude signals AM31 and AM32 resulted from controlling of the flicker amplitude signal A_* in the amplitude amplifier 515A and amplitude attenuator 514B are supplied to the multipliers 515A and 515B, respectively, the image signal DV_* digitized by the A-D converter 20* will be supplied, via the low-pass filters (LPF) 517A and 517B, to the level adjusters 516A and 516B, and correction values CFD31 and CFD32 generated by the level adjusters 516A and 516B, respectively, are supplied to the operational units 518A and 518B, respectively.

In the flicker-added signal generators 51A and 51B of the correction amplitude error detector 50* constructed as above, the address calculators 511A and 511B calculate the address AD31 in the ROM on the basis of the correction error signal E_*. The address to be thus calculated is the top address of a flicker component of a next frame. This address is calculated as in the address calculator 31* in the flicker correction circuit 30*. Also, the ROM included in the correction amplitude error detector 50* is identical to that included in the flicker correction circuit 30*.

The address converters 512A and 512B convert the address AD31 calculated by the address calculators 511A and 511B into an address from which a flicker of a next frame can be reproduced. More specifically, they convert the phase of the address AD31 into an address AD32 opposite in phase to the address AD31. The addresses AD32 converted by the address converters 512A and 512B is resulted from prediction of flickers of the next frame, but not intended for correction of the flickers.

The correction value calculators 513A and 513B calculate flicker data FD31 on the basis of the address AD32 converted by the address converters 512A and 512B. The flicker data FD31 is also determined per line as in the flicker correction circuit 30*. The correction value calculators 513A and 513B are similarly constructed to the correction value calculator 32* included in the flicker correction circuit 30*.

Next, the amplitude amplifier 514A calculates an amplitude signal AM31 resulted from amplification of the amplitude signal A_*. At the same time, the amplitude attenuator 514B attenuates the supplied amplitude signal A_* to calculate an amplitude signal AM32. The multipliers 515A and 515B multiply the calculated amplitude signals AM31 and AM32 by the flicker data FD31 to provide flicker correction data FDA31 having a flicker component thereof amplified and flicker correction data FDA32 having a flicker component thereof attenuated.

Also in the flicker-added signal generators 51A and 51B of the correction amplitude error detector 50*, the image signal DV_* is passed through the low-pass filters (LPF) 517A and 517B as in the flicker correction circuit 30* to remove noises from the image signal DV_*, and the noise-free image signal DV_*' is supplied to the level adjusters 516A and 516B. The level adjusters 516A and 516B calculate correction values CFD31 and CFD32 for each pixel from the noise-free image signal DV_*' and flicker data FDA31 and FDA32 calculated by the correction value calculators 515A and 515B, respectively.

The level adjusters 516A and 516B are constructed like the level adjuster 34* included in the flicker correction circuit 30*.

The operational units 518A and 518B add the correction values CFD31 and CFD32 for each pixel to the flicker-corrected image signal CV_* to generate flicker-added signals FDV31 and FDV32 of a next frame. The operational units 518A and 518B are similarly constructed to the operational unit 36 included in the flicker correction circuit 30*.

Then, the flicker-added signals FDV31 and FDV32 of a next frame, supplied from the operational units 518A and 518B, respectively, are processed as in the correction phase error detector 40*.

That is, the line integrators 52A and 52B integrate segments of the next frame where the flicker-added signals FDV31 and FDV32 exist to calculate line data LD31 and LD32.

The line data LD31 and LD32 calculated by the line integrators 52A and 52B are stored in the memories 53A and 53B, respectively, until the image signal DV_* of a next frame is supplied. When the image signal DV_* of the next frame is supplied, the line integrator 55 makes line integration of the same segments as those of the flicker-added signals FDV31 and FDV32 which have been integrated to calculate the line data LD3.

The line data LD31 and LD32 stored in the memories 53A and 53B, respectively, and line data LD3 of the next-frame image signal DV_* corresponding to the lines of the line data LD31 and LD32 are supplied to the difference detectors 54A and 54B to provide difference data DD31 and DD32.

The integrators 56A and 56B provide integrated data ID31 and ID32, respectively, by integrating the two difference data DD31 and DD32, respectively.

Then, the comparator 57 makes a comparison in size between these integrated data ID31 and ID32 to provide a comparison signal C* indicative of whether the amplitude of the next-frame flicker should be amplified or attenuated.

Figure 11:
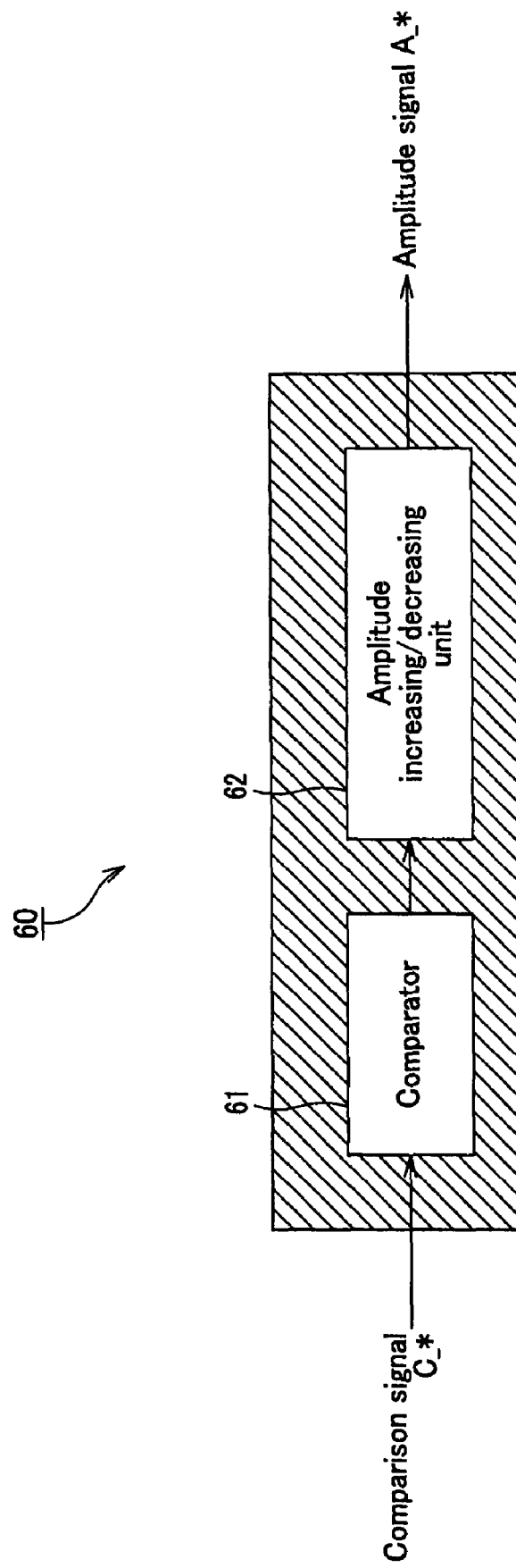
FIG. 11 is a schematic block diagram of a flicker amplitude adjuster included in the image pickup device.

The comparison signal C_* provided in the correction amplitude error detector 50* is supplied to the flicker amplitude adjuster 60*. As shown in FIG. 11, the flicker amplitude adjuster 60* includes a comparator 61 and amplitude increasing/decreasing unit 62 and always varies the flicker amplitude on the basis of the comparison signal C_*. The flicker amplitude adjuster 60* functions to vary the flicker amplitude in a direction in which the comparison signal C_* supplied from the correction amplitude error detector 50* will be smaller. It should be noted here that a smaller comparison signal C_* means that a prediction-based flicker image is more approximate to an actual image formed by the image sensing device 10*. Namely, examining, by the comparator 61, the relation in size of the comparison signal C_* between the frames permits to judge whether the flicker level has been predicted accurately. For example, in case the comparison signal C_* is larger than that of a preceding frame when the flicker amplitude has been increased, it can be determined that the flicker amplitude has been predicted inaccurately. In this case, the flicker amplitude is to be decreased by the amplitude increasing/decreasing unit 62. On the contrary, in case the comparison signal C_* is smaller than that of the preceding frame, it can be determined that the flicker amplitude has been predicted accurately. In this case, the flicker amplitude is to be increased by the amplitude increasing/decreasing unit 62. With these operations, the amplitude signal A_* is provided as an output.

Thus, by varying, according to the aforementioned correction error detection algorithm, the level in a direction in which the integrated value of the two difference data DD31 and DD32 will be smaller, it is possible to vary the correction level to an optimum one as the time elapses.

It should be understood by those skilled in the art that various modifications, combinations, sub-combinations and alterations may occur depending on design requirements and other factors insofar as they are within the scope of the appended claims or the equivalents thereof.

What is claimed is:

1. A flicker correction method of a flicker correction device comprising the steps of:
    predicting, from an image of a present flicker-corrected frame, a flicker of an image of a next frame to generate first and second types of flicker images having flickers different in level from each other added thereto;
    detecting a flicker amplitude component through comparison between (a) the generated first type of flicker image and an image of an input next frame and (b) the generated second type of flicker image and the image of the input next frame;
    generating a flicker amplitude correction value on the basis of the detected flicker amplitude component; and
    making flicker amplitude correction by adding the generated flicker amplitude correction value to an input image frame by frame.

2. A flicker correction device comprising:
    a flicker correcting means for making flicker amplitude correction by adding a flicker amplitude correction signal to an input image signal; and
    a flicker correction signal generating means for predicting a flicker of an image of a next frame from the image signal having been flicker-corrected by the flicker correcting means and an image signal not yet flicker-corrected to generate first and second types of flicker images to which flickers different in level from each other are added thereto, for detecting a flicker amplitude component through comparison between (a) the generated first type of flicker image and an image of an input next frame and (b) the generated second type of flicker image and the image of the input next frame and for generating a flicker amplitude correction value on the basis of the detected flicker amplitude component,
    the flicker correcting means making flicker amplitude correction by adding the flicker amplitude correction signal generated frame by frame by the flicker correction signal generating means to the input image signal.

3. The device according to claim 2, wherein the flicker correction signal generating means comprises:
    a correction phase error detecting means for detecting a correction phase error by predicting a flicker of an image signal of a next frame from the image signal flicker-corrected by the flicker correcting means and an image signal not yet flicker-corrected to generate first and second types of flicker image signals having flickers different in level to each other added thereto and making a comparison between (a) the generated first type of flicker image signals and an image signal of an input next frame and (b) the generated second type of flicker image signals and the image signal of the input next frame;
    a correction amplitude error detecting means for detecting a correction amplitude error by predicting a flicker of an image signal of a next frame from the image signal flicker-corrected by the flicker correcting means and an image signal not yet flicker-corrected to generate first and second types of flicker image signals having flickers different in level to each other added thereto and making a comparison between (a) the generated first type of flicker image signals and an image signal of an input next frame and (b) the generated second type of flicker image signals and the image signal of the input next frame; and a flicker amplitude adjusting means for generating an amplitude signal according to which the amplitude of a flicker correction signal is controlled in a direction in which the correction amplitude error detected by the correction amplitude error detecting means will be smaller, the flicker correction signal being generated based on the correction phase error signal generated by the correction phase error detecting means and amplitude signal generated by the flicker amplitude adjusting means.

4. An image pickup device including a flicker correction device to make flicker correction by adding a flicker correction signal to an image signal captured by the image pickup device, the flicker correction device comprising:

a flicker correcting means for making flicker amplitude correction by adding a flicker amplitude correction signal to an input image signal; and a flicker correction signal generating means for predicting a flicker of an image of a next frame from the image signal having been flicker-corrected by the flicker correcting means and an image signal not yet flicker-corrected to generate first and second types of flicker images to which flickers different in level from each other are added thereto, for detecting a flicker amplitude component through comparison between (a) the generated first type of flicker image and an image of an input next frame and (b) the generated second type of flicker image and the image of the input next frame and for generating a flicker amplitude correction value on the basis of the detected flicker amplitude component, the flicker correcting means making flicker amplitude correction by adding the flicker amplitude correction signal generated frame by frame by the flicker correction signal generating means to the input image signal.

5. A flicker correction device comprising:

a flicker correction circuit for making flicker amplitude correction by adding a flicker amplitude correction signal to an input image signal; and a flicker correction signal generator for predicting a flicker of an image of a next frame from the image signal having been flicker-corrected by the flicker correction circuit and an image signal not yet flicker-corrected to generate first and second types of flicker images to which flickers different in level from each other are added thereto, for detecting a flicker amplitude component through comparison between (a) the generated first type of flicker image and an image of an input next frame and (b) the generated second type of flicker image and the image of the input next frame and for generating a flicker amplitude correction value on the basis of the detected flicker amplitude component, the flicker correction circuit making flicker amplitude correction by adding the flicker amplitude correction signal generated frame by frame by the flicker correction signal generator to the input image signal.

6. An image pickup device including a flicker correction device to make flicker correction by adding a flicker correction signal to an image signal captured by the image pickup device, the flicker correction device comprising:

a flicker correction circuit for making flicker amplitude correction by adding a flicker amplitude correction signal to an input image signal; and a flicker correction signal generator for predicting a flicker of an image of a next frame from the image signal having been flicker-corrected by the flicker correction circuit and an image signal not yet flicker-corrected to generate first and second types of flicker images to which flickers different in level from each other are added thereto, for detecting a flicker amplitude component through comparison between (a) the generated first type of flicker image and an image of an input next frame and (b) the generated second type of flicker image and the image of the input next frame and for generating a flicker amplitude correction value on the basis of the detected flicker amplitude component, the flicker correction circuit making flicker amplitude correction by adding the flicker amplitude correction signal generated frame by frame by the flicker correction signal generator to make flicker correction to the input image signal.

7. The method according to claim 1, wherein the flicker amplitude component varies in a direction in which the comparison is smaller.

8. The method according to claim 1, wherein the flicker amplitude component indicates whether an amplitude of a next frame flicker is amplified or attenuated.

* * * * *